(12) United States Patent
Lee et al.

(10) Patent No.: US 9,365,137 B2
(45) Date of Patent: Jun. 14, 2016

(54) APPARATUS FOR LOCKING FOLDED STATE OF SEAT FOR VEHICLE

(71) Applicants: Hyundai Motor Company, Seoul (KR); Kia Motors Corporation, Seoul (KR); DAS CO., LTD, Gyeongju-si (KR)

(72) Inventors: Byung Jae Lee, Gunpo-Si (KR); Yong Soo Chang, Seoul (KR); Won Hyo Jo, Ulsan (KR)

(73) Assignees: Hyundai Motor Company, Seoul (KR); Kia Motors Corporation, Seoul (KR); DAS CO., LTD, Gyeongju-si (KR)

( * ) Notice: Subject to any disclaimer, the term of this patent is extended or adjusted under 35 U.S.C. 154(b) by 0 days.

(21) Appl. No.: 14/554,530

(22) Filed: Nov. 26, 2014

(65) Prior Publication Data
US 2015/0375646 A1    Dec. 31, 2015

(30) Foreign Application Priority Data

Jun. 27, 2014    (KR) .......................... 10-2014-0079651

(51) Int. Cl.
*B60N 2/14*    (2006.01)
*B60N 2/30*    (2006.01)
*B60N 2/20*    (2006.01)

(52) U.S. Cl.
CPC ................ *B60N 2/3088* (2013.01); *B60N 2/20* (2013.01)

(58) Field of Classification Search
CPC .................................. B60N 2/20; B60N 2/206
USPC ......... 296/65.09, 65.16, 65.03; 297/326, 335, 297/336, 341, 378.1, 378.12, 378.14
See application file for complete search history.

(56) References Cited

U.S. PATENT DOCUMENTS 5,577,805 A * 11/1996 Glinter ............... B60N 2/01583
                                                          296/65.03
7,325,876 B2 * 2/2008 Lavoie ............... B60N 2/01583
                                                          296/65.09

FOREIGN PATENT DOCUMENTS

| JP | 5-44669      | 6/1993 |
| JP | 2006-21747 A | 1/2006 |
| KR | 1999-0041272 | 6/1999 |
| KR | 10-2006-0005474 | 1/2006 |

* cited by examiner

*Primary Examiner* — Dennis H Pedder
(74) *Attorney, Agent, or Firm* — Morgan, Lewis & Bockius LLP

(57) ABSTRACT

An apparatus for locking a folded state of a seat for a vehicle may include first links each of which rotates depending on whether the seat is fastened to a vehicle body, a second link that rotates depending on the rotation of the first links, and a locking link which has a plurality of fastening portions and is rotatable in accord with rotation of the seat. The second link is selectively fastened to different fastening portions of the locking link depending on the rotation of the second link.

9 Claims, 5 Drawing Sheets

APPARATUS FOR LOCKING FOLDED STATE OF SEAT FOR VEHICLE

CROSS-REFERENCE TO RELATED APPLICATION

The present application claims priority of Korean Patent Application Number 10-2014-0079651 filed on Jun. 27, 2014, the entire contents of which application are incorporated herein for all purposes by this reference.

BACKGROUND OF INVENTION

1. Field of Invention

The present invention relates to an apparatus for locking a folded state of a seat for a vehicle, and more particularly, to an apparatus for locking a folded state of a seat for a vehicle which can prevent the folded state of a seat from being released in a case where a detachable seat is not completely fastened to a vehicle.

2. Description of Related Art

Recently, an object of using a vehicle becomes diversified and thus a necessity of a configuration for varying interior space of a vehicle has been rising as necessary.

According to a related art, as a method for ensuring the interior space of a vehicle, the methods for folding a rear seat and loading goods over there or moving the rear seat frontward and rearward to ensure the interior space, have been proposed. However, such methods are to ensure only a cargo space while the seat is loaded as it is in a vehicle, and thus play a role in unnecessarily increasing the weight of a vehicle. Accordingly, a detachable seat as necessary is required.

A related art entitled "Detachable seat device for a vehicle", has disclosed a technology for responding to the request by customers that the detachable seat device is provided with a locking unit and the seat is detached when the locking unit is released. However, there is no function to ensure whether the seat has been fastened completely when the seat is fastened again even under the related art and thus there is a risk that passengers use a vehicle while the seat is fastened incompletely.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above drawbacks and/or other problems, and the present invention is to provide an apparatus for locking a folded state of a seat for a vehicle, which prevents the folded state of a seat from returning to original state under the circumstance that a detachable seat is not completely fastened to a vehicle body, so that it can be ensured of the seat completely being fastened to the vehicle body.

An apparatus for locking a folded state of seat for a vehicle according to various aspects of the present invention may include: first links each of which rotates depending on whether the seat is fastened to a vehicle body; a second link that rotates depending on the rotation of the first links; and a locking link which has a plurality of fastening portions and is rotatable in accord with rotation of the seat, wherein the second link is selectively fastened to different fastening portions of the locking link depending on the rotation of the second link.

When the seat and the vehicle body are separated, the second link may be fastened to a first fastening portion of the locking link, and when the second link is fastened to the first fastening portion, the locking link is fixed. When the seat is fastened to the vehicle body, the second link may be fastened to a second fastening portion of the locking link, and when the second link is fastened to the second fastening portion, the locking link is rotatable.

Each of a front end and a rear end of the seat may be fastened to the vehicle body, and the first links are provided on locations corresponding to fastening points to the vehicle body.

The apparatus for locking a folded state of a seat for a vehicle according to the present invention may further include a wire that connects one end of the first link and one end of the second link, wherein the other end of the second link is fastened to the first fastening portion by a pulling force of the wire so as to separate the seat from the vehicle body. The apparatus for locking a folded state of a seat for a vehicle according to the present invention may further include a first elastic portion that rotates the first link to apply the pulling force to the one end of the second link through the wire when the seat and the vehicle body are to be separated.

The apparatus for locking a folded state of a seat for a vehicle according to the present invention may further include a first elastic portion that rotates the first link so that a part of the first link is protruded toward the vehicle body when the seat and the vehicle body are to be separated. The apparatus for locking a folded state of a seat for a vehicle according to the present invention may further include a second elastic portion that rotates the second link so that the second link is fastened to the second fastening portion when the seat is fastened to the vehicle body.

A long hole may be formed through the locking link along a rotation direction of the locking link and the second fastening portion includes the long hole. A catching groove may be formed substantially perpendicular to a rotation path of the long hole and the first fastening portion includes the catching groove. A catching pin may be provided on the other end of the second link, which is inserted into the second fastening portion and moves along the second fastening portion. The catching groove may be disposed at a location corresponding the catching pin when the seat rotates to be folded. One end of the second fastening portion in the rotation direction may be bent in a length direction of the catching pin to be higher than a height of the catching pin.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
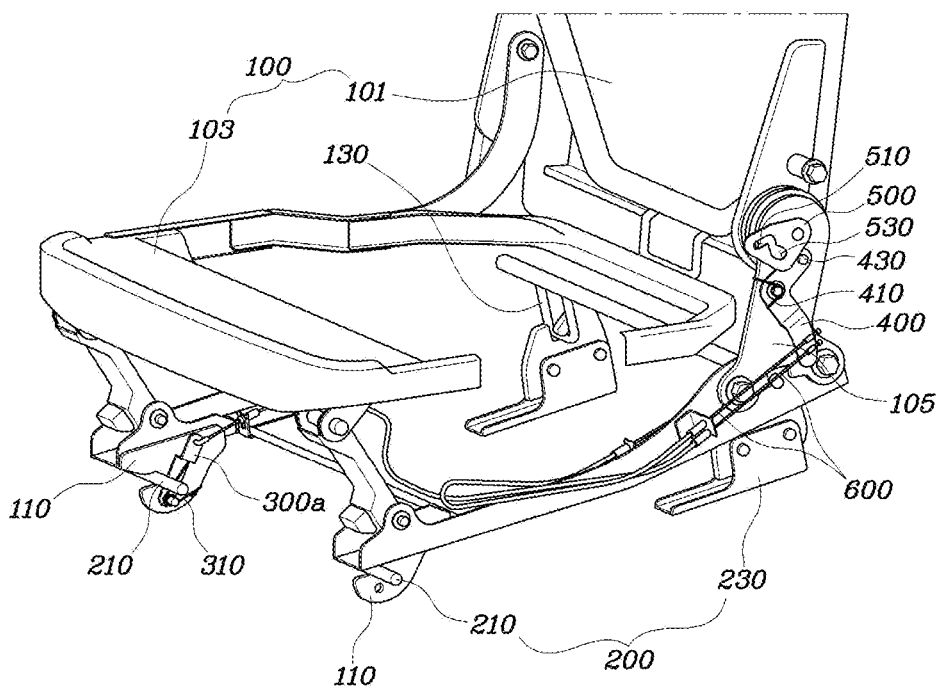
FIG. 1 is a perspective view illustrating an exemplary apparatus for locking a folded state of a seat for a vehicle according to the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2A:
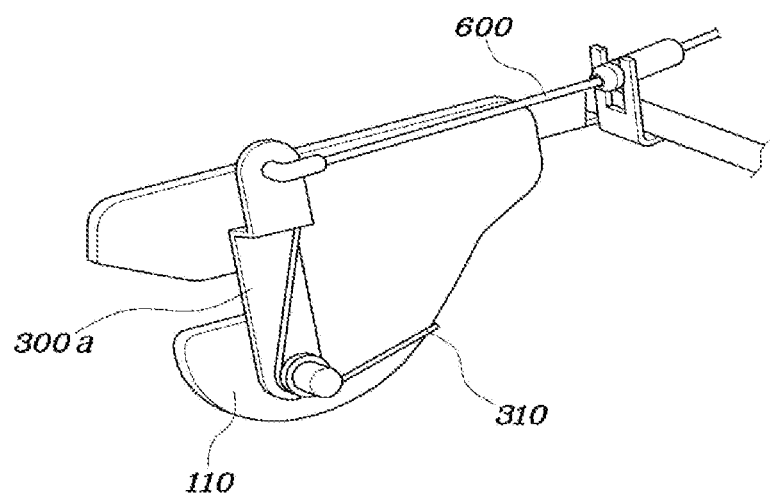
FIGS. 2A to 2B and 3A to 3B are views illustrating a first link of an exemplary apparatus for locking a folded state of a seat for a vehicle according to the present invention.
Figure 2B:
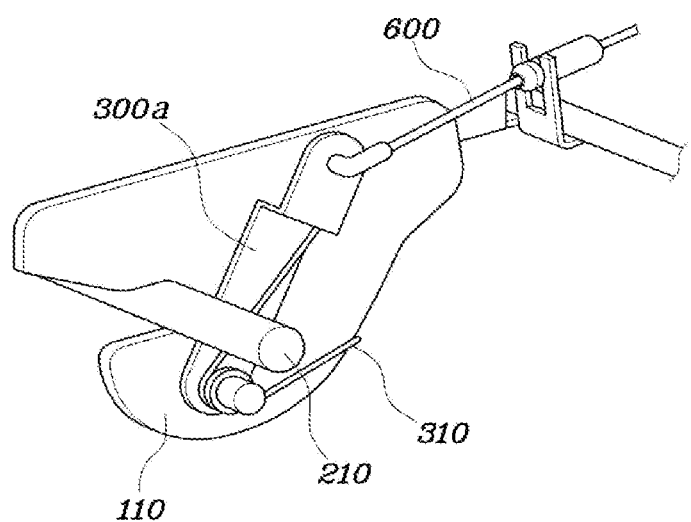
Figure 3A:
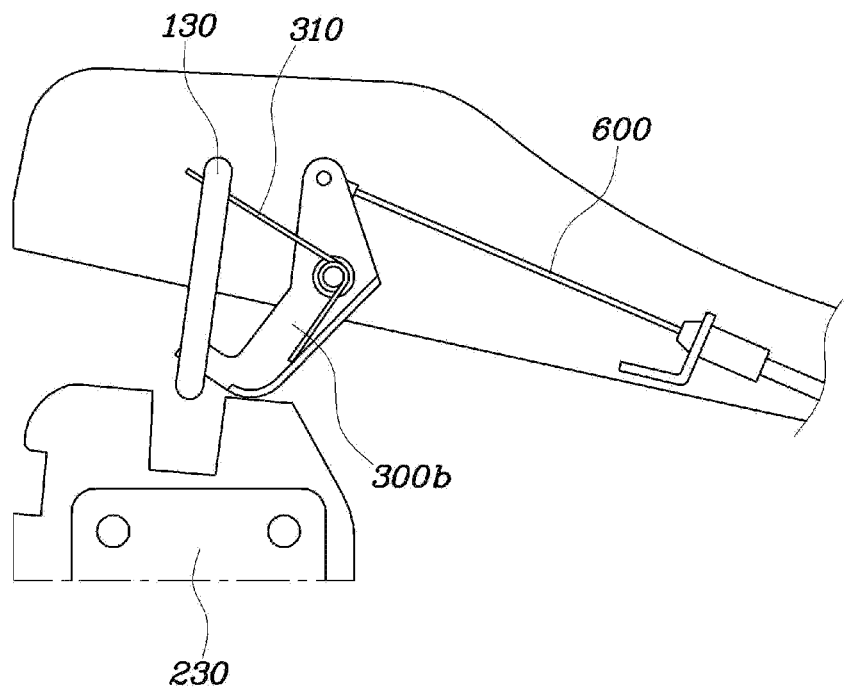
Figure 3B:
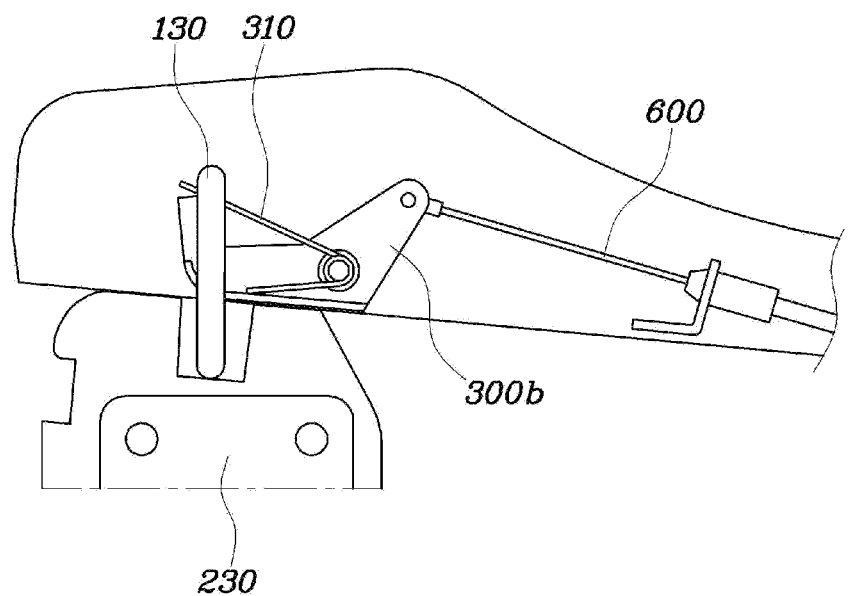
Figure 4A:
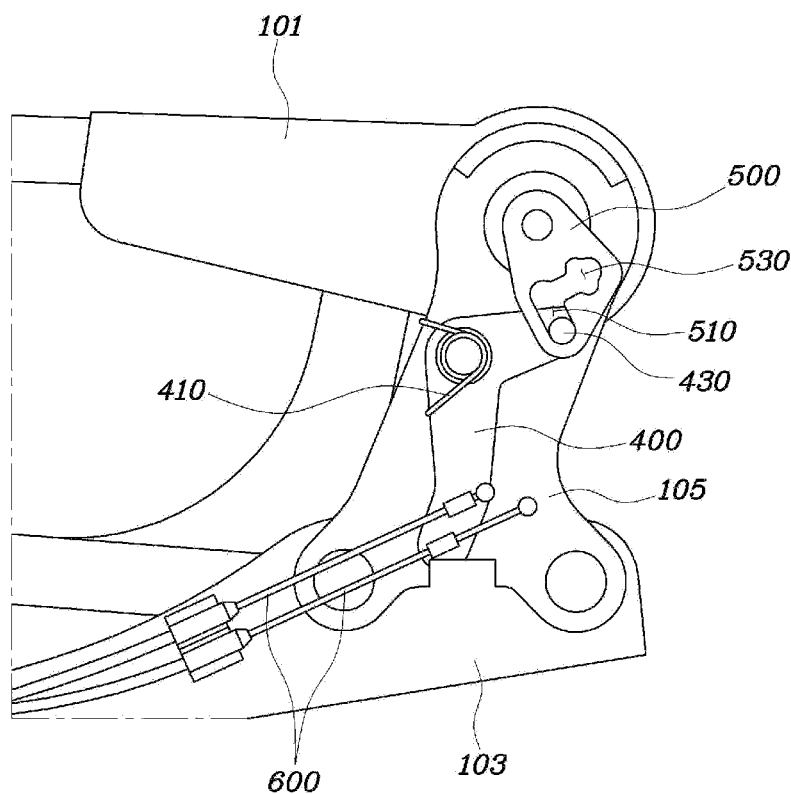
FIGS. 4A to 4B are views illustrating a second link and a locking link of an exemplary apparatus for locking a folded state of a seat for a vehicle according to the present invention.
Figure 4B:
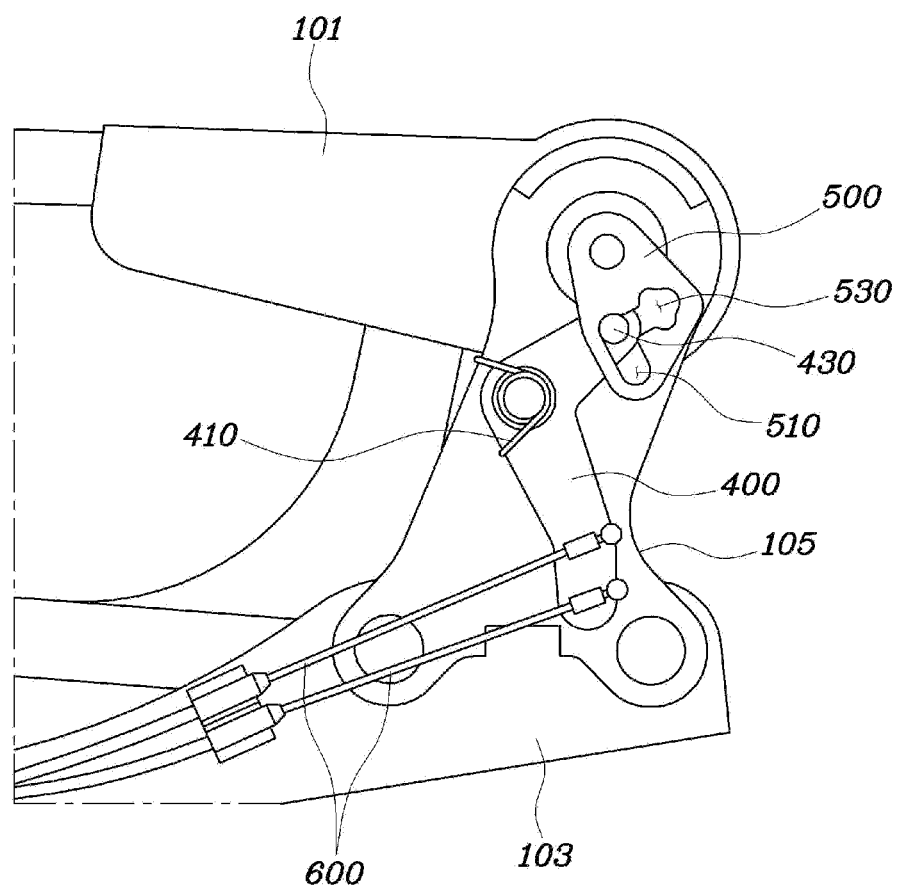

FIG. 1 is a perspective view illustrating an apparatus for locking a folded state of a seat for a vehicle, FIGS. 2A to 2B and 3A to 3B are views illustrating the first links 300a, 300b of an apparatus for locking a folded state of a seat for a vehicle, and FIG. 4A to 4B are views illustrating a second link 400 and a locking link 500 of an apparatus for locking a folded state of a seat for a vehicle according to various embodiments of the present invention.

The apparatus for locking a folded state of a seat for a vehicle as shown in FIGS. 1 to 4B according to various embodiments of the present invention may include: first links 300a, 300b each of which rotates depending on whether a seat 100 and a vehicle body 200 are fastened; a second link 400 that rotates in link with the rotation of the first links 300a, 300b; and a locking link 500 which has a plurality of fastening portions 510, 530, to different fastening portions 510, 530 of which the second link 400 is fastened depending on the rotation location of the second link 400 and which rotates in link with the rotation of the seat 100.

In more detail, a seat back 101 of the seat 100 is foldable, a seat cushion 103 is fastened and fixed to a floor of the vehicle body 200, and a latch 230 is provided on a floor of the vehicle body 200 so that the seat 100 is detachable. The latch 230 arranged on the floor is configured as various forms and may the same as or similar to a related art and thus detailed description thereof is omitted.

The latch 230 may be provided at each of locations corresponding to a front end and a rear end of the seat cushion 103, or may be provided on either of locations corresponding to the front end and the rear end of the seat cushion 103.

As an example, the illustrated embodiment is to describe a case in which the latch 230 is provided as a pair on a location of the floor corresponding to the rear end of the seat cushion 103; and a catching ring 210 is provided as a pair on a location of the floor corresponding to the front end of the seat cushion 103; and the fastening ring that is to be fastened to the latch and a hook that is caught-connected to the catching ring may be provided to the seat cushion 103 located at the position which corresponds to the latch and the catching ring. However, various embodiments of the fastening configuration of the seat and the vehicle body may be available according to the intention of a designer or the structure of the seat and the vehicle body or other factors.

To further explain in detail in regard to the first links 300a, 300b according to an embodiment of the present invention, the first links 300a, 300b are provided on a front end and a rear end of the seat cushion 103, respectively, wherein a front first link 300a is provided on a front end of the seat cushion 103 and a rear first link 300b is provided on a rear end of the seat cushion 103. The front and rear first links 300a, 300b may be provided with only one of each but they may be provided by two at one time. In the illustrated embodiment, they are provided with only one of each.

Further, it is clarified that in the illustrated embodiment in a case where the front first link 300a and the rear first link 300a are used distinguishably, it is applied to only each front first link 300a and the rear first link 300b and in a case where the first links 300a, 300b are called as a common name, it is applied commonly to the front first link 300a and the rear first link 300b.

As shown in FIGS. 2A to 3B, each of the first links 300a, 300b may be hinge-connected to the seat 100 rotatably, a wire 600 that is connected to one end of the second link 400 is connected to one end of each of the first links 300a, 300b, and a first elastic portion 310 for rotating each of the first links 300a, 300b may be provided on a connection point between each of the first links 300a, 300b and the seat 100.

The first elastic portion 310 may rotate each of the first links 300a, 300b to provide a pulling force to one end of the second link 400 through the wire 600 when the seat 100 and the vehicle body 200 are separated and when each of the first links 300a, 300b are rotated by the first elastic portion 310, a part of each of the first links 300a, 300b may be protruded toward the vehicle body 200. The first elastic portion 310 may be an elastic spring but it is not limited thereto.

Here, the vehicle body 200 may include all of the catching ring 210 and the latch 230.

Specially, FIGS. 2A to 2B are views illustrating the front first link 300a wherein FIG. 2A is a view shows a case where the catching ring 210 is not caught on the hook 110 and FIG. 2B is a view shows a case where the catching ring 210 is caught on the hook 110.

When the other end of the front first link 300a is hinge-connected to the seat 100 and in a case where the catching ring 210 is inserted into the hook 110 and is not caught-connected thereto, the front first link 300a is rotated in the insertion direction of the catching ring 210 as it contacts the catching ring 210 when the catching ring 210 is inserted into the hook 110 so as to fasten the seat 100 to the vehicle body 200 while the front first link 300a is protruded toward the catching ring 210 by the first elastic portion 310. One end of the front first link 300a may be directed toward the insertion direction of the catching ring 210 and as a result the wire 600 is loosened to release the pulling force of the second link 400.

Meanwhile, FIGS. 3A to 3B are views illustrating the rear first link 300b wherein FIG. 3A shows a case where the fastening ring 130 is not fastened to the latch 230 and FIG. 3B shows a case where the fastening ring 130 is fastened to the latch 230.

When the intermediate portion between one end and the other end of the rear first link 300b is hinged-connected to the seat 100, in a case where the fastening ring 130 is inserted into the latch 230 and is not fastened thereto, the other end of the rear first link 300b is rotated toward the seat 100 as the other end of the rear first link 300b contacts the latch 230 when the fastening ring 130 is inserted into the latch 230 while the other end of the rear first link 300b is protruded toward the latch 230 by the first elastic portion. The wire 600 is arranged to the rotation direction when the seat 100 is fastened to the vehicle body 200 and thus the wire is loosened thereby to release the pulling force of the second link 400.

The wire may be provided separately on the front first link 300a and the rear first link 300b.

Meanwhile, FIGS. 4A to 4B are views illustrating the second link 400 wherein FIG. 4A shows a state where the seat 100 and the vehicle body 200 are not fastened and FIG. 4B show a state where the seat 100 and the vehicle body 200 are fastened.

The second link 400 may be provided on a side of the seat 100, and more particularly, on a bracket 105 that connects the seat cushion 103 and the seat back 101, however the second link 400 may be disposed variably depending on a designer's intention or the structure of the seat and the vehicle body or other factors.

An intermediate portion between one end and the other end of the second link 400 may be hinge-connected to the bracket 105 and the wire 600 is connected to one end thereof to be connected to the first links 300a, 300b, the other end thereof is fastened to the locking link 500 to define the rotation thereof.

Further, a second elastic portion 410 may be further provided for rotating the second link 400 and the second elastic portion 410 may apply rotation force to the second link 400 in an opposing to the pulling direction of the wire 600. The second elastic portion 410 may be a torsion spring the same as the first elastic portion 310 but it may be another spring or elastic member and thus various embodiments thereof can be implemented.

Meanwhile, the locking link 500 may be provided with a first fastening portion 510 and a second fastening portion 530. In more detail, a long hole is formed through one end of the locking link 500 along the rotation direction of the locking link 500 and the second fastening portion 530 may be the long hole. Further, a catching groove is formed perpendicular or substantially perpendicular to the rotation path of the locking link 500 and the first fastening portion may be the catching groove.

The other end of the locking link 500 is hinge-connected to the seat 100, and more particularly, to the bracket 105 to be rotated wherein it may be linked with a rotation shaft of the seat back 101 and is rotated together with the seat back 101 when the seat back 101 rotates, or it may be connected directly to the rotation shaft of the seat back 101 and is rotated together with the seat back 101. Accordingly, when the rotation of the locking link 500 is blocked, the rotation of the seat back 101 is blocked also, and when the locking link 500 is to be rotatable, the seat back also to be rotatable.

Meanwhile, a catching pin 430 may be further provided on the other end of the second link 400, which is inserted into the second fastening portion 530 and moves along the second fastening portion 530 by the rotation of the second link 400.

The catching pin 430 may move to the first fastening portion 510 by the rotation of the second link 400 while it moves along the second fastening portion 530, and when the catching pin 430 moves to the first fastening portion 510, the movement of the locking link 500 is blocked thereby to restrict the movement of the seat back 101 as well.

The shape and location of the second link 400 and the first fastening portion 510 may be determined such that in a case where the seat 100 and the vehicle body 200 are not fastened in a folded state of the seat back 101, the first fastening portion 510 is disposed at a point corresponding to the catching pin 430 when the seat back 101 rotates to be folded, so as to allow the seat back 101 not to be back.

Further, one end of the second fastening portion 530 into which the catching pin 430 is inserted may be bent in a length direction of the catching pin 430 to be higher than a height of the catching pin 430 so that the catching pin 430 is to be inserted into the second fastening portion 530 or refracted therefrom. As a result, the catching pin 430 is movable through inner and external parts of the locking link 500, and since the length of the second fastening portion 530 is only to an extent that, without being lengthened to the rotation radius of the seat back 101, the catching pin 430 is disposed within the second fastening portion 530 when the seat back is folded and thus the size and weight of the locking link 500 can be reduced, thereby ensuring the interior space of a vehicle.

Hereinafter, an operation of the apparatus for locking a folded state of a seat for a vehicle will be described.

The wire 600 is loosened through the rotation of the first links 300a, 300b when the seat 100 and the vehicle body 200 are fastened and thus the pulling force of the wire toward the second link 400 is released. At this time, the second link 400 rotates to the direction to which a rotation force of the second elastic portion 410 is applied by the second elastic portion 410 and the seat back 101 of the seat 100 is in a state where it can rotate freely since the catching pin 430 is disposed on the second fastening portion 530. At this time, if the seat back 101 is in a folded state, the catching pin 430 may be disposed at a point corresponding to the first fastening portion 510 among the second fastening portion 530, and if the folded state of the seat back 100 is released and thus the seat back is in an unfolded state, the catching pin 430 is separated toward the outside of the locking link 500.

Meanwhile, in a case where the seat 100 and the vehicle body 200 are not fully or partly fastened in a folded state of the seat back 101, at least one or more of the front first link 300a and the rear first link 300b rotate by the first elastic portion 310 to apply the pulling force to the wire 600 and the pulling force is applied to one end of the second link 400, and the second link 400 overcomes the rotation force of the second elastic portion 410 and rotates. The catching pin 430 is moved to the first fastening portion 510 by the rotation of the second link 400 and the rotation of the locking link 500 is restricted.

Even though it is described that when the seat 100 is fastened to the vehicle body 200, the wire 600 is loosened in the illustrated embodiment, there may be various embodiments thereof such as a case where the wire 600 is pulled when the seat 100 is fastened to the vehicle body 200 and at this time the rotation of the locking link 500 is restricted, depending on the setting of the application direction of the rotation forces of each link and elastic portion and the shape of each fastening portion.

According to the apparatus for locking a folded state of a seat for a vehicle, which is configured as described above, when the seat 100 is not fastened to the vehicle body 200, the rotation of the locking link 500 is restricted wherein when the seat 100 is fastened again after it is separated, a worker can confirm surely the fastening of the seat 100, thereby ensuring safety of a vehicle.

Further, even though the latch 230 is arranged on the vehicle body with respect to fastening of the seat 100 and the vehicle body 200, incomplete fastening can be checked, thereby reducing weight of the seat and improving safety of a vehicle.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for locking a folded state of a seat for a vehicle, comprising:
   first links each of which rotates depending on whether the seat is fastened to a vehicle body;
   a second link that rotates depending on the rotation of the first links; and
   a locking link which has a plurality of fastening portions and is rotatable in accord with rotation of a seat back, wherein the second link is selectively fastened to different fastening portions of the locking link depending on the rotation of the second link,
   wherein when the seat and the vehicle body are separated, the second link is fastened to a first fastening portion of the locking link, and when the second link is fastened to the first fastening portion, the locking link is fixed,
   wherein when the seat is fastened to the vehicle body, the second link is fastened to a second fastening portion of the locking link, and when the second link is fastened to the second fastening portion, the locking link is rotatable,
   wherein a long hole is formed through the locking link along a rotation direction of the locking link and the second fastening portion includes the long hole, and
   wherein a catching groove is formed substantially perpendicular to a rotation path of the long hole and the first fastening portion includes the catching groove.

2. The apparatus for locking the folded state of the seat for the vehicle of claim 1, wherein each of a front end and a rear end of the seat is fastened to the vehicle body, and the first links are provided on locations corresponding to fastening points to the vehicle body.

3. The apparatus for locking the folded state of the seat for the vehicle of claim 1, further comprising:
   a wire that connects one end of at least one of the first links and one end of the second link, wherein another end of the second link is fastened to the first fastening portion by a pulling force of the wire when the seat and the vehicle body are not fastened.

4. The apparatus for locking the folded state of the seat for the vehicle of claim 3, further comprising:
   a first elastic portion that rotates at least one of the first links to apply the pulling force to the one end of the second link through the wire when the seat and the vehicle body are separated.

5. The apparatus for locking the folded state of the seat for the vehicle of claim 1, further comprising:
   a first elastic portion that rotates at least one of the first links so that a part of the at least one first link is protruded toward a front side of the vehicle body when the seat and the vehicle body are separated.

6. The apparatus for locking the folded state of the seat for the vehicle of claim 1, further comprising:
   a second elastic portion that rotates the second link so that the second link is fastened to the second fastening portion when the seat is fastened to the vehicle body.

7. The apparatus for locking the folded state of the seat for the vehicle of claim 1, wherein a catching pin is provided on an end of the second link, which is inserted into the second fastening portion and moves along the second fastening portion.

8. The apparatus for locking the folded state of the seat for the vehicle of claim 7, wherein the catching groove is disposed at a location corresponding to the catching pin when the seat back rotates and is folded.

9. The apparatus for locking the folded state of the seat for the vehicle of claim 7, wherein one end of the second fastening portion in the rotation direction is bent in a direction substantially perpendicular to a horizontal movement direction of the catching pin to be higher than a height of the catching pin.

* * * * *